March 31, 1953     C. V. ROBINSON     2,633,533
SCANNING ANTENNA
Filed Aug. 1, 1945
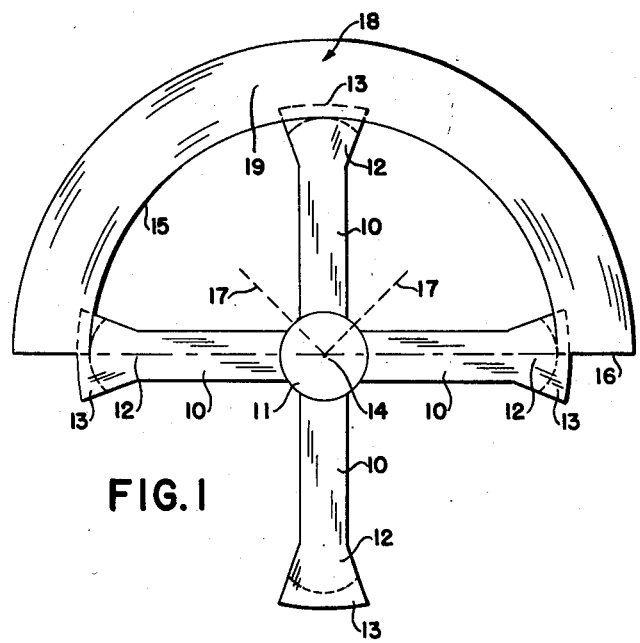
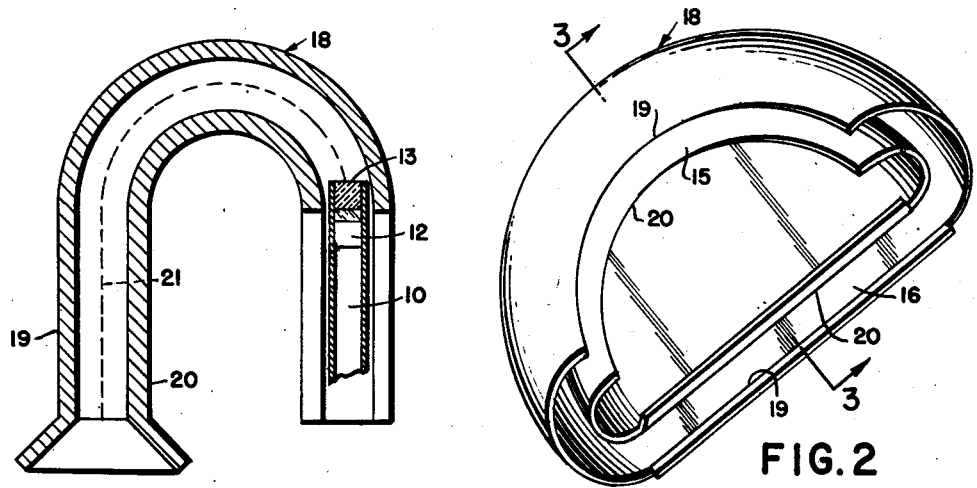
INVENTOR
CHARLES V. ROBINSON
BY
*William D. Hall*
ATTORNEY Patented Mar. 31, 1953

2,633,533

UNITED STATES PATENT OFFICE 2,633,533

SCANNING ANTENNA

Charles V. Robinson, Newton Center, Mass., assignor, by mesne assignments, to the United States of America as represented by the Secretary of War Application August 1, 1945, Serial No. 608,299

4 Claims. (Cl. 250—33.63)

This invention relates to antenna systems and particularly to such means adapted to radiate or intercept electromagnetic waves in a desired direction.

An object of this invention is to provide improved means for scanning a sector of space with electromagnetic radiation at a high rate without mechanical movement of the entire antenna.

Other objects, advantages, and novel features of the invention will appear more fully herein.

In the drawings:

Fig. 1 illustrates in plan a preferred embodiment of the invention;

Fig. 2 is a perspective view of a wave guide contemplated for use in the apparatus of Fig. 1;

Figure 3 is a sectional view of the waveguide of Figure 2 taken along the line 3—3 of Figure 2, including also a partial sectional view of the end of one of the waveguides 10 of Figure 1.

Wave guides 10 extend radially from a rotating joint 11 to which electromagnetic energy is fed from a suitable source. The rotating joint 11 may include switching means such as disclosed in the application of Lan J. Chu, Ivan A. Getting, and Henry A. Strauss, Serial No. 535,856, filed May 16, 1944 Patent No. 2,549,721 granted April 17, 1951. Apertures 12 at the outer termini of wave guides 10 are closed by lenses 13 composed of "polystyrene" or other material refractive to electromagnetic radiation. Wave guides 10 are rotatable about axis 14. The rotating joint 11 may also include any well known means, for example a motor, for causing waveguides 10 to rotate about axis 14. It is to be understood, of course, that the invention is not limited to a motor located within rotating joint 11 since the method of rotating waveguides 10 about axis 14 is a matter of design and mechanical expediency. Electromagnetic energy may be fed through wave guides 10 and lenses 13 into semi-circular aperture 15 of wave guide 18, Figs. 1 and 2, of the pill-box type. The energy then passes through wave guide 18 and is emitted from an aperture 16 at the extremity thereof. The switching means above-mentioned may be adapted to permit each wave guide 10 to transmit energy only when it lies within the sector of 90° between lines 17, each of which is disposed at a 45° angle with respect to the line of aperture 16. Wave guide 18 is formed of two members 19 and 20 affording conductive, substantially parallel surfaces preferably separated by less than one-half wave length near the mid-frequency of the proposed band of operating frequencies, and the median surface represented by the dashed line 21 of Figure 3 lying between the two conductive surfaces, at least for a portion of its extent, is in the shape of a surface of revolution such as a toroid. For reasons of clarity, median surface 21 is not shown in Figs. 1 and 2. The term, median surface, refers to an imaginary surface line midway between the parallel surfaces 19 and 20, defined above.

Because of the semi-circular shape of wave guide 18 unequal path lengths are presented to the plane of the energy propagated into it from wave guide 10 and therefore the phase front of the wave which is emitted from aperture 16, in the absence of lenses 13, has the shape of a curved plane. In this connection reference is made to co-pending application of Lan J. Chu and Charles V. Robinson, Serial No. 608,298, filed August 1, 1945, in which the wave front which emanates from such an apparatus is considered without regard to a corrective lens such as here employed.

The purpose of lenses 13 is to correct the curvature of the phase front, and cause a straight line phase front to emanate from aperture 16. By a straight line phase front is meant that the plane of the phase front of the emitted wave is flat. The lenses 13 compensate in advance of wave guide 18 for the effects produced on the radiated wave front by the unequal path lengths of wave guide 18. Various methods might be employed to calculate the necessary shape of the lens having a knowledge of the refractive index of the material with which it is to be made. The shape of the lenses 13 may also be determined by graphical methods applying well known optical principles.

The use of lenses does not require the choice of a particular size or optimum ratio of dimensions of the wave guide for a desired approach to a straight line phase front. Therefore, the height of the median surface of revolution of wave guide 18 may be considerably reduced, thereby reducing the weight and the size of the structure and providing a more compact apparatus. Furthermore, lenses 13 may be relatively thin, and dielectric losses are consequently small.

It should now be apparent from the foregoing description of the invention that as wave guides 10 rotate about axis 14 energy radiated from aperture 16 is caused to scan a sector in space in a plane perpendicular to axis 14. Stated in another way, suppose wave guides 10 in Figure 1 rotate clockwise about axis 14 at a predetermined rate of speed. In this case when one of wave guides 10 just enters the sector defined by lines 17 energy is supplied to this wave guide, Because of the geometry of the structure of wave guide 18, and because of the fact that the maximum in energy intensity which is propagated by wave guide 10 lies within the boundaries defined by the conducting walls of wave guide 10, the energy propagated by wave guide 10 into wave guide 18 will be conducted by wave guide 18 and radiated through orifice 16 backward in the direction of the exciting wave guide. With the wave guide in this position, the direction of the major lobe of the radiated wave or the maximum in the space energy pattern will lie to the right of the normal to aperture 16 as seen Figure 1. As wave guide 10 moves clockwise to the position shown in Figure 1 the direction of the maximum will move toward the normal to aperture 16 and as wave guide 10 advances beyond the position shown in Figure 1 the direction of the maximum in the space energy pattern will move to the left of the normal to aperture 16 as seen in Figure 1. Since the wave emitted from aperture 16 has a planar phase front because of the effects of lenses 13, the emitted wave is highly directional.

It should be obvious from the geometry of Figure 1 that as one of wave guides 10 moves out of the sector defined by lines 17 another wave guide enters this sector so that the scanning cycle is repeated.

It should be further noted here that during the scanning cycle the only parts of the antenna that move are wave guides 10 and rotating joint 11. Since these parts are light in weight and are arranged symmetrically about axis 14, they may be rotated at relatively high speed without difficulty. This results in a much faster wide angle scan than was heretofore possible.

For a more detailed explanation of the theory of how the energy radiated from stationary aperture 16 is caused to scan a sector in space reference is again made to the copending application of Lan Jen Chu and Charles V. Robinson.

Although the discussion herein has been directed to the transmission of energy from a source, a converse effect permits the same structure to be used in the reception of radiation with similar directive properties, as is well known in the art.

Many variations of the invention will be apparent to those skilled in the art and it is therefore not desired to restrict the scope of the claims to the precise embodiment as herein disclosed.

What is claimed is:

1. An apparatus for scanning a sector of space with electromagnetic radiation including a first wave guide formed of two members providing conductive substantially parallel surfaces, said members being so shaped that the median surface between said parallel surfaces comprises substantially a portion of a surface of revolution, a movable wave guide for transmitting electromagnetic radiation to said first wave guide, and a lens closing said movable wave guide, said lens being formed of material refractive to said radiation and so shaped that when said radiation is fed through said movable wave guide the radiation emanating from said first wave guide shall have a planar phase front.

2. An apparatus for scanning a sector of space with electromagnetic radiations including a first waveguide formed of two members providing conductive substantially parallel surfaces, said members being so shaped that the median surface between said parallel surfaces comprises substantially a portion of a surface of revolution, a second waveguide rotatable about the axis of said surface of revolution, and a lens interposed between said first and second waveguide and rotatable with said second waveguide, said lens being formed of material refractive to said radiation and shaped to alter the path of energy passing between said two waveguides to determine the phase front of the energy radiated from said first waveguide.

3. An apparatus for scanning a sector of space with electromagnetic radiations including a first waveguide formed of two members providing conductive substantially parallel surfaces, said members being so shaped that the median surface between said parallel surfaces comprises substantially a portion of a surface of revolution, a second waveguide rotatable about the axis of said surface of revolution, and a concavo-convex lens interposed between said first and second waveguide and rotatable with said second waveguide, said lens being formed of material refractive to said radiation and shaped to correct the spherical aberration of said first waveguide to cause the energy that is radiated from said first waveguide to have a planar phase front.

4. An antenna for scanning a sector in space comprising a first waveguide having an input section in the form of half an annulus, an output section in the form of a half circle having the same axis and the same circumference as said input section, and a U-shaped section joining said input and output section; a second waveguide rotatable about the axis of said first waveguide and positioned to propagate electromagnetic energy into said input section, and a lens carried in the end of said second waveguide proximal to said first waveguide, said lens being formed of a material refractive to electromagnetic energy and shaped to correct for wave front distortions caused by said first waveguide in the wave radiated from said output section.

CHARLES V. ROBINSON.

REFERENCES CITED

The following references are of record in the file of this patent:

UNITED STATES PATENTS

| Number | Name | Date |
| --- | --- | --- |
| 2,202,380 | Hollman | May 28, 1940 |
| 2,283,568 | Ohl | May 19, 1942 |
| 2,283,935 | King | May 26, 1942 |
| 2,405,242 | Southworth | Aug. 6, 1946 |
| 2,434,253 | Beck | Jan. 13, 1948 |